2,714,087

STABILIZATION OF PHENOL ALKYLATES

Donald R. Stevens, Wilkinsburg, and Samuel C. Camp, Richland Township, Allegheny County, Pa., assignors to Gulf Research & Development Company, Pittsburgh, Pa., a corporation of Delaware No Drawing. Application October 31, 1949, Serial No. 124,722

14 Claims. (Cl. 202—57)

This invention relates to the stabilization of phenol alkylates, and it is particularly concerned with a method of inhibiting the dealkylation of alkylated phenols when they are subjected to temperatures normally causing dealkylation.

Phenol or its homologs, such as the cresols, xylenols, and ethyl phenols, are readily alkylated with olefins, particularly the tertiary olefins (olefins capable of forming tertiary alcohols on hydration) in the presence of a catalyst such as sulphonic acids; sulfuric acid; alkyl esters of sulfuric acid; aluminum chloride; hydrogen chloride; zinc chloride; boron trichloride; boron trifluoride; complexes of boron trihalides with water, ethers, alcohols, etc.; and phosphoric acid. The resulting crude alkylate, however, is acidic and will tend to undergo dealkylation at elevated temperatures unless the acid component is removed or its dealkylation-promoting tendency inhibited. For example, when a mixture of meta- and para-cresol is alkylated with the isobutylene of a $C_4$ refinery gas cut in the presence of sulfuric acid, the resulting crude alkylate usually contains a mixture of mono- and di-tertiary-butyl para-cresol, and mono- and di-tertiary-butyl meta-cresol, together with some extraneous non-phenolic acidic materials such as sulfuric acid, mono-tert-butyl sulfate, mono-sec-butyl sulfate, di-sec-butyl sulfate, sulfonic acids, sulfones, and the like. The di-tertiary-butyl para-cresol is particularly useful as an antioxidant in petroleum products such as cracked gasoline, lubricating and insulating oils, greases, and the like. The di-tertiary-butyl meta-cresol is useful in the reclaiming of rubber, as a tackifier, and in the preparation of surface active agents, and also is a useful starting material in processes of chlorination, nitration, hydrogenation, vinylation, sulfurization, aldehyde condensation, and the like. The mono-tertiary-butyl cresols may be treated with sulfur dichloride to form rubber stabilizers or they can be recycled for further alkylation. Accordingly, it is desirable to fractionate the crude alkylate to obtain cuts predominating in a single phenolic compound.

Before the crude alkylate is fractionated, however, it must be stabilized against dealkylation because the non-phenolic acidic materials present in the alkylate act as dealkylation catalysts even at the temperature required for vacuum distillation. Stabilization of the alkylate is important, of course, not only when the alkylate is subjected to fractional distillation but also when the alkylate is subjected to temperatures normally causing dealkylation in the presence of small amounts of acidic materials. Such temperatures are often encountered when the alkylate is used as a chemical intermediate.

We have found that an alkylate stabilized against dealkylation at elevated temperatures can be obtained by treating the crude acidic alkylate in steps comprising washing the acidic alkylate with a non-acid aqueous medium and intimately contacting the washed alkylate with at least the stoichiometric quantity of an alkaline agent necessary to neutralize the extraneous non-phenolic acidic matter in said washed alkylate, said alkaline agent selected from the group consisting of the alkali metal phenates and alkali metal alcoholates, said alcoholates containing at least two carbon atoms.

In accordance with the present invention, the first step, i. e., washing of the acidic alkylate with a non-acid aqueous medium, removes the water-soluble and easily neutralizable materials from the alkylate such as free sulfuric acid, mono-tert-alkyl sulfates, mono-sec-alkyl sulfates, and sulfonic acids. In the second step, the washed alkylate is contacted with an alkali metal phenate or alcoholate having at least two carbon atoms, whereby the dealkylation-promoting tendency of the remaining acidic bodies consisting of the more refractory materials such as di-sec-alkyl sulfates, sulfones, and the like, is inhibited.

In the first step of the process, we use a neutral or basic aqueous material which effectively removes the water-soluble and the easily neutralizable acidic material from the acid alkylate. Naturally, if the alkylated phenol is soluble in or reacts with dilute aqueous alkali solutions, we will employ only water for washing purposes in the first step. However, in the case of meta- or para-cresol, the alkylated derivatives are not soluble in and do not react with dilute aqueous alkali solutions so that the crude acidic alkylated cresols can be washed either with water or with dilute aqueous alkali solutions. For example, we have found that water and dilute solutions of aqueous caustic soda produce good results. Aqueous solutions of other alkalies, such as potassium hydroxide and ammonium hydroxide, can also be used. In some instances where the alkylate is strongly acid, an economic procedure to follow is to wash the crude acidic alkylate first with water and then with a dilute aqueous alkali solution, i. e., aqueous 5 to 10 per cent alkali solution. The amount of the solution used will vary depending uopn the acid content of the alkylate.

The washing step can be readily carried out either in batch or continuous operation, either at room temperature or at an elevated temperature. In batch operation the acidic phenol alkylate is introduced into a vessel along with a suitable quantity of the non-acid aqueous solution. The alkylate and the aqueous solution are then agitated together for a time sufficient to remove the water-soluble and the easily neutralizable acidic material. The mixture is then allowed to settle and the aqueous phase is separated from the non-aqueous phase. If desired this washing step may be repeated. The non-aqueous phase, herein referred to as the "washed alkylate," is then intimately contacted with the alkali metal phenate or alcoholate.

The second step comprising contacting the washed alkylate with the alkali metal phenate or alcoholate can be carried out either in batch or continuous operation, either at room temperature or at an elevated temperature. The amount of phenate or alcoholate required in this step is sufficiently small, usually less than about 1 per cent based on the weight of the washed alkylate, so that its presence is not objectionable when the alkylate is subjected to distillation or when the alkylate is used as a chemical intermediate. Accordingly, the alkaline agent need not be removed from the treated alkylate.

The exact manner in which the alkaline agents function in stabilizing the alkylate in step two of our process is not certain; therefore, we do not wish to limit our invention with respect to theory. It is believed, however, that the stabilizing efficiency of the alkaline agents depends to some extent upon their solubility in the alkylate, thus bringing the alkaline agent and the residual acidic material into the same phase. Although the net result of their action on an alkylate should be equivalent to complete neutralization, it is not certain that this condition has actually been brought about. Therefore, in referring to the treated alkylate we prefer to call it a stabilized alkylate rather than a neutralized alkylate.

The alkaline agents which we use in the second step of our process include the alkali metal salts of a phenol such as the alkali metal salt of phenol itself and the alkali metal salts of its homologs, such as ortho-cresol, meta-cresol, and para-cresol, or mixtures of these such as are found in commercial cresylic acid, xylenols, ethyl phenols, propyl phenols, nonyl phenols, and the like, and the alkali metal salts of alcohols having at least two carbon atoms. While the alkali metal salt of methyl alcohol improves the dealkylation characteristics of an acidic alkylate, it is not as efficient as the alkali metal salts of alcohols containing two or more carbon atoms, presumably because the alkali metal salt of methyl alcohol is not sufficiently soluble in the alkylate. Therefore, we prefer to use the alcohols containing between two and nine carbon atoms because these alcohols form alkali metal salts which are soluble in the alkylate. Specific examples of some of the alkaline agents which we have found to be particularly satisfactory are sodium phenate, sodium cresylate, sodium ethylate, sodium propylate, and sodium isopropylate. The method of preparing the alkali metal salts is not critical. For example, when employing sodium cresylate as the alkaline agent, we have obtained equally good results from sodium cresylate prepared in the following ways:

(1) By treating a 60–40 mixture of meta- and para-cresol with the theoretical amount of 20 per cent aqueous NaOH, and evaporating to dryness in an atmosphere of nitrogen at 110° to 120° C.

(2) By refluxing theoretical quantities of metallic sodium and a re-distilled commercial meta-para-cresol mixture in xylene until the sodium disappeared, then removing the xylene by vacuum distillation.

(3) By mixing theoretical quantities of meta-cresol and 50 per cent NaOH, and using the resulting moist crystalline mass. Corrections were made, of course, for moisture content in determining the amount to be used.

For purposes of determining the stoichiometric amount of alkaline agent required in step two, we have resorted to the use of the saponification number test (ASTM D94–41T) commonly used for determining the saponifiable material in animal, vegetable or mineral oils. The saponification number, however, does not necessarily give an accurate indication of the amount of the non-phenolic acidic material present in any alkylated phenol. For example, if phenol itself is alkylated, a portion of the alkylated product may react with the caustic potash used in carrying out the saponification number test with the result that a higher saponification number would be obtained. In general, however, the increase in the saponification number resulting from the reaction of the phenolic material with the alkali is so small that it can be disregarded. It should be understood, however, that the stoichiometric amount of alkaline agent required in step two should be based upon the amount theoretically required to neutralize the extraneous, non-phenolic acidic material in the alkylate.

When the alkylate introduced into step one contains non-phenolic acidic material in an amount sufficient to give a saponification number of about 15 or 20, the alkylate is advantageously washed until the saponification number is reduced to about 2. While the washing need not be carried out to this extent, we have found that when the saponification number is reduced in the washing step to about 2, only the theoretical amount of alkaline agent as calculated from the saponification number need be added to the alkylate in the second step to prevent dealkylation when it is heated to temperatures normally causing dealkylation in the presence of small amounts of acidic material. When the alkylate is washed in the first step only enough to reduce the saponification number to about 5, greater than the stoichiometric quantity of alkaline agent is required in the second step to produce an alkylate which will not dealkylate at elevated temperatures. Therefore, depending upon the degree of washing in the first step, we may employ between about one and about three times the stoichiometric quantity of alkaline agent in the second step. More than three times the theoretical amount of alkaline agent can be used, but from an economic standpoint it is not desirable to use more than the least amount required to effect complete stabilization. In commercial practice the extent of the washing depends upon the relative cost of the washing as compared with the cost of the additional amount of alkaline agent required when the saponification number is not reduced to about 2.

The effectiveness of stabilizing crude alkylate in steps comprising washing the alkylate with a non-acid aqueous medium and then contacting the washed alkylate with an alkali metal phenate or alcoholate having at least two carbon atoms will be demonstrated by the following dealkylation test in which a given amount of treated alkylate is subjected to fixed dealkylation heating conditions so that the results in a series of tests are directly comparable.

In carrying out this test, 10 grams of treated alkylate are placed in a glass chamber of about 50 milliliter capacity surrounded by a bath of vapors from boiling nitrobenzene. The chamber is connected through a condenser to a gasometer filled with saturated salt water for collecting the gas evolved. In this way the extent of the dealkylation occurring is indicated by the volume of gas collected in the gasometer, which corresponds to the volume of salt water displaced. In this test the alkylate is heated at about 205° C. for two hours, and the volume of gas collected at the end of 30, 60 and 120 minutes is noted and recorded. The recorded figures thus give numerical values which can conveniently be used to compare and evaluate the respective stabilization efficiency of different stabilizing procedures.

In the application of the above test to commercial practice an alkylate is considered to be completely stabilized when the amount of gas collected between 30 and 120 minutes (Δ120–30) is zero. In strongly acidic alkylates, however, substantial dealkylation may take place in the first 30 minutes, in which case the amount of gas collected during the next 90 minutes may be small. Thus in evaluating the stabilization efficiency of a particular stabilizing process the Δ120–30 value should be considered in connection with the volume of gas collected during the first 30 minutes. For instance, a 10 gram portion of an acidic di-tertiary-butyl cresol may have a Δ120–30 value as low as 90, but the volume of gas given off in the first 30 minutes may be as much as 1750 cc., indicating almost complete dealkylation. Theoretically, a 10 gram portion of di-tertiary-butyl cresol should upon dealkylation produce about 1900 cc. of isobutylene.

Even with stabilized alkylates some gas is collected at the start of the test as a result of the expansion of air dissolved in, or introduced along with, the sample, and also from expansion of residual moisture contained in the alkylate. To determine what portion of the initial gas collected may result from the expansion of air in the heating zone of the dealkylation apparatus, a 10 gram sample of pure 2,6-di-tertiary-butyl para-cresol was introduced and heated. At the end of 120 minutes, 40 cc. of gas had collected. The 40 cc. of gas collected is thus considered to be a measure of the air introduced into the system along with the sample. To determine what portion of the initial gas may result from the combined air and moisture content, a 10 gram sample of alkylate was treated by refluxing for several hours in 100 grams of absolute alcohol containing 10 grams of potassium hydroxide. The alkylate was then water-washed and allowed to stand overnight in a desiccator containing $P_2O_5$. A measurement in the dealkylation apparatus showed 120.0 cc. of gas evolved in 30 minutes and 137.0 cc. at the end of 120 minutes. The 137 cc. of gas is considered to correspond to the air and moisture content introduced with the sample. Accordingly, in the following examples gas volumes higher than about 140 cc. may be considered to be isobutylene.

In the following specific examples the alkylate was obtained by alkylating a close-boiling meta-para-cresol mixture with the isobutylene contained in a refinery C4 cut using 5 per cent of concentrated sulfuric acid as the catalyst. The alkylate thus obtained had a saponification number of 15.1. The alkylated derivatives of the cresols do not react with and are not soluble in dilute aqueous alkali solutions; therefore, this saponification number is considered to be an accurate indication of the non-phenolic acidic material present in the alkylate. Likewise, in the following examples, the saponification numbers of the alkylated cresols are an accurate measurement of the non-phenolic acidic material present.

*Example 1*

In this example a sample of the alkylate having a saponification number of 15.1 was washed at room temperature with an excess of aqueous 10 per cent NaOH. The washed alkylate had a saponification number of 1.7. When the alkylate was subjected to the above-described dealkylation test there were 714.0 cc. of gas collected in 30 minutes and 1582.0 cc. of gas collected at the end of 120 minutes. From this it is evident that the alkylate washed only with an excess of 10 per cent NaOH is not completely stabilized.

*Example 2*

In this example a sample of the alkylate having a saponification number of 15.1 was water washed 6 times at room temperature. The washed alkylate had a saponification number of 5.6. When this alkylate was subjected to the dealkylation test there were 1750.0 cc. of gas collected in 30 minutes and 1840.0 cc. of gas collected at the end of 120 minutes, indicating almost complete dealkylation of the alkylate.

*Example 3*

In this example a sample of the water-washed alkylate obtained as described in Example 2 was treated with 3.3 times the stoichiometric amount of sodium cresylate at 90° C. for 90 minutes. When the treated alkylate was subjected to the dealkylation test there were 104.0 cc. of gas collected at the end of 30 minutes with no increase at the end of 120 minutes. The 104.0 cc. of gas may be attributed to the air and moisture introduced with the sample. The Δ120–30 value of zero indicates complete stabilization of the alkylate.

*Example 4*

In the series of experiments reported in this example the washed alkylate obtained as described in Example 1 was treated with the indicated amounts of sodium cresylate at 90° C. with stirring for 30 minutes. The results obtained when the treated alkylate was subjected to the dealkylation test are given in the following table.

| Experiment No. | Wt. Sodium Cresylate per 10 gm. Alkylate | Percent Sodium Cresylate | Times Theoretical | Gas Collected (cc.) | | | Δ120–30 |
|---|---|---|---|---|---|---|---|
| | | | | 30 min. | 60 min. | 120 min. | |
| 1 | 0.0 | | | 714.0 | 1,143.0 | 1,582.0 | 868.0 |
| 2 | 0.0200 | 0.20 | 0.5 | 125.0 | 125.0 | 210.0 | 85.0 |
| 3 | 0.0395 | 0.40 | 1.0 | 105.0 | 105.0 | 105.0 | 0.0 |
| 4 | 0.0580 | 0.58 | 1.5 | 127.0 | 128.0 | 128.0 | 1.0 |
| 5 | 0.1150 | 1.15 | 2.9 | 92.0 | 92.0 | 92.0 | 0.0 |

It can be seen from the above data that substantial dealkylation occurred (Experiment No. 1) when the alkylate was washed with excess aqueous NaOH but not treated with sodium cresylate. It is further shown that while 0.5 time the theoretical amount of sodium cresylate required to effect neutralization gave remarkably improved results with respect to dealkylation, it did not bring about complete stabilization as evidenced by the Δ120–30 value of 85.0. However, when the alkylate was treated with at least the theoretical amount of sodium cresylate, complete stabilization was effected.

*Example 5*

In this example crude alkylate having a saponification number of 15.1 was washed at room temperature with an excess of aqueous 10 per cent NaOH. The washed alkylate had a saponification number of 1.2. A sample of the washed alkylate was then treated with the theoretical amount of sodium cresylate at 90° C. for 7 minutes. The results obtained when the treated alkylate was subjected to the dealkylation test are given in the following table.

| Wt. Sodium Cresylate per 10 gm. Alkylate | Times Theoretical | Gas Collected (cc.) | | | Δ120–30 |
|---|---|---|---|---|---|
| | | 30 min. | 60 min. | 120 min. | |
| 0.0 | | 402.0 | 798.0 | 1,185.0 | 783.0 |
| 0.041 | 1.0 | 92.5 | 92.5 | 99.2 | 6.7 |

It can be seen that practically complete stabilization was obtained by treating the alkylate with the theoretical amount of sodium cresylate at 90° C. for only 7 minutes.

*Example 6*

In this example a sample of the washed alkylate of Example 5 having a saponification number of 1.2 was treated with the theoretical amount of sodium cresylate required to effect complete neutralization at room temperature for only one minute, after which the alkylate was heated over a bath of boiling nitrobenzene in accordance with the dealkylation test. The results obtained are shown as follows:

| Wt. Sodium Cresylate per 10 gm. Alkylate | Times Theoretical | Gas Collected (cc.) | | | Δ120–30 |
|---|---|---|---|---|---|
| | | 30 min. | 60 min. | 120 min. | |
| 0.0 | | 402.0 | 798.0 | 1,185.0 | 783.0 |
| 0.041 | 1.0 | 207.0 | 211.0 | 214.0 | 7.0 |

The sodium cresylate employed in this example was prepared by mixing theoretical quantities of metacresol and 50 per cent aqueous sodium hydroxide. Accordingly, considerable moisture was introduced into the system which accounts for the 207.0 cc. of gas collected during the first 30 minutes. It is apparent from the Δ120–30 value of only 7.0, however, that the alkylate is substantially neutral after being treated even at room temperature with the theoretical amount of sodium cresylate.

The advantge of reducing the saponification number of the alkylate to about 2 before subjecting it to treatment with sodium cresylate will be shown in the following table.

| Saponification Number of Alkylate | Times the Theoretical Amount of Sodium Cresylate Required to Effect Complete Stabilization |
|---|---|
| 4.9 | 3.4 |
| 1.7 | 1.0 |
| 1.2 | 1.0 |

It can be seen that as long as the saponification number of the alkylate is below 2, only the theoretical amount of sodium cresylate was required to effect stabilization. When the saponification number was about 5, however, more than three times the theoretical amount of sodium cresylate was required to effect stabilization.

*Example 7*

In this example a sample of the washed alkylate of Example 5 having a saponification number of 1.2 was admixed with the theoretical amount of sodium ethylate, after which the alkylate was subjected to the dealkylation test. Evidence of stabilization in shown in the following table.

| Wt. Sodium Ethylate per 10 gm. Alkylate | Times Theoretical | Gas Collected (cc.) | | | Δ120-30 |
|---|---|---|---|---|---|
| | | 30 min. | 60 min. | 120 min. | |
| 0.0134 | 1.0 | 89.0 | 89.0 | 89.0 | 0.0 |

When Example 7 was repeated using sodium isopropylate in lieu of sodium ethylate, the Δ120–30 value was also zero.

While the invention has been described herein with particular reference to certain embodiments and specific examples by way of illustration, it is to be understood that the invention is not limited to such embodiments and specific examples except as hereinafter defined in the appended claims.

We claim:

1. In a method of inhibiting the dealkylation of crude acidic alkylated phenols having a saponification number in excess of 2, at temperatures normally causing dealkylation thereof, the improvement which comprises washing said alkylated phenols with a nonacidic aqueous medium to lower the saponification number to a value not more than about 2, and then adding to the washed alkylate, and maintaining therein, a stoichiometric quantity of an alkaline agent, said quantity of alkaline gent being sufficient to neutralize the non-phenolic acidic matter remaining in said washed alkylate, said alkaline agent selected from the group consisting of alkali metal phenates and alkali metal alcoholates, said alcoholates having at least two carbon atoms.

2. The method of claim 1 wherein the non-acidic aqueous medium consists of water.

3. The method of claim 2 wherein the alkaline agent is an alkali metal phenate.

4. The method of claim 3 wherein the alkali metal phenate is sodium cresylate.

5. The method of claim 2 wherein the alkaline agent is an alkali metal alcoholate having at least two carbon atoms.

6. The method of claim 5 wherein the alkali metal alcoholate is sodium ethylate.

7. The method of claim 1 wherein the non-acidic aqueous medium is a dilute aqueous alkali solution.

8. The method of claim 7 wherein the alkaline agent is an alkali metal phenate.

9. The method of claim 8 wherein the alkali-metal phenate is sodium cresylate.

10. The method of claim 7 wherein the alkaline agent is an alkali metal alcoholate having at least two carbon atoms.

11. The method of claim 10 wherein the alkali metal alcoholate is sodium propylate.

12. In a method of stabilizing an acidic phenol alkylate having a saponification number in excess of 2, the improvement which comprises washing said alkylate with water, separating the non-aqueous phase from the aqueous phase, washing the non-aqueous phase with a dilute aqueous alkali solution, the combined water washing and alkali washing being sufficient to lower the saponification number to a value not more than about 2, and then adding to the alkali-washed alkylate, and maintaining therein a stoichiometric quantity of an alkaline agent, said quantity of alkaline agent being sufficient to neutralize the non-phenolic acidic matter remaining in said washed alkylate, said alkaline agent selected from the group consisting of alkali metal phenates and alkali metal alcoholates, said alcoholates having at least two carbon atoms.

13. The method of claim 12 wherein the alkaline agent is an alkali metal phenate.

14. The method of claim 13 wherein the alkali metal phenate is sodium cresylate.

References Cited in the file of this patent

UNITED STATES PATENTS

| | | |
|---|---|---|
| 1,931,057 | Clemmensen | Oct. 17, 1933 |
| 2,050,188 | Lee | Aug. 4, 1936 |
| 2,125,961 | Shoemaker | Aug. 9, 1938 |
| 2,248,828 | Stevens | July 8, 1941 |
| 2,310,663 | Weinrich | Feb. 9, 1943 |
| 2,393,154 | Franklin | Jan. 15, 1946 |
| 2,393,531 | Hart | Jan. 22, 1946 |
| 2,502,001 | Feasley | Mar. 28, 1950 |
| 2,529,209 | Ayo | Nov. 7, 1950 |
| 2,656,311 | Stevens et al. | Oct. 20, 1953 |